Aug. 15, 1967 — W. R. PRICE — 3,336,035
MULTIPLE PASSAGE GASKET
Filed Aug. 3, 1965
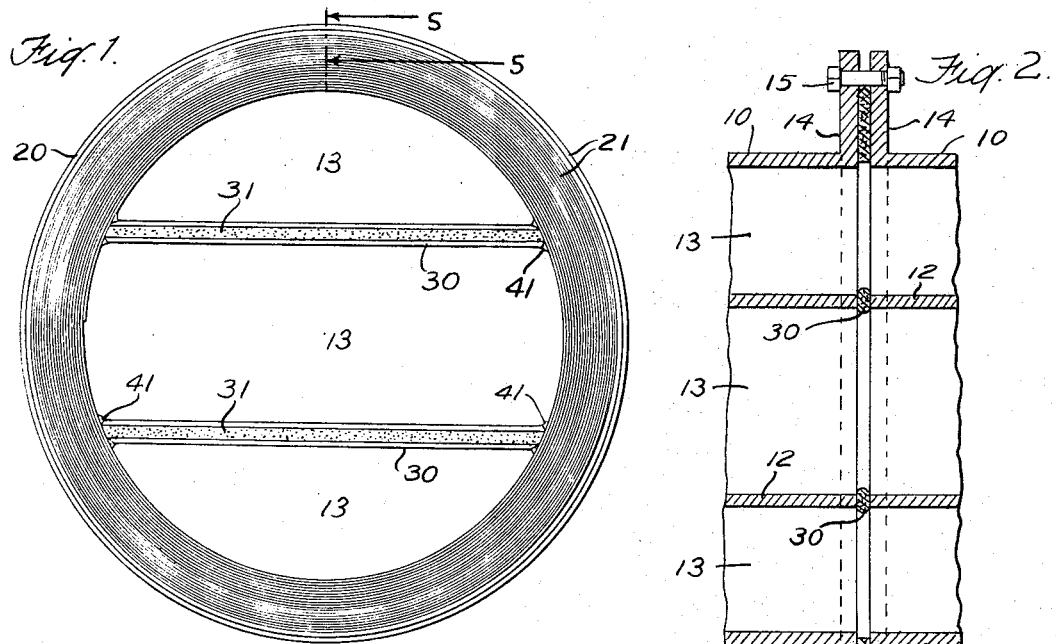
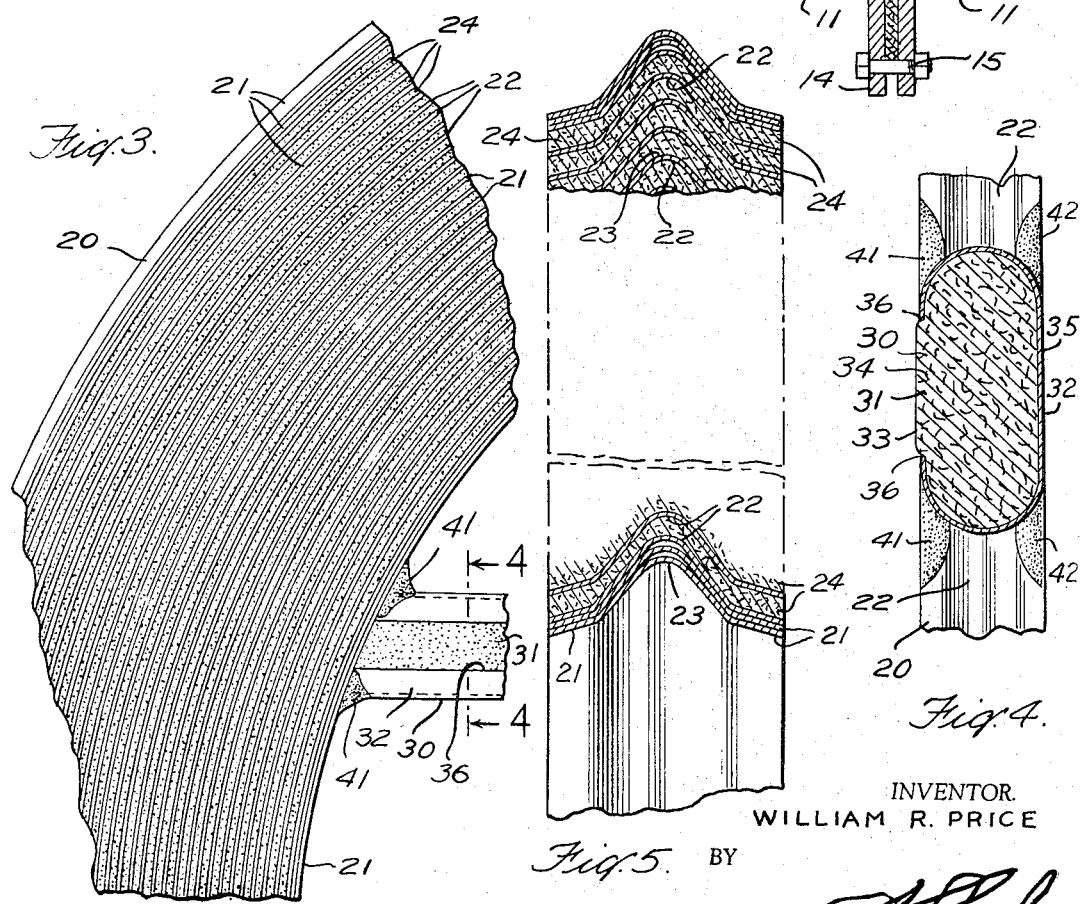
INVENTOR.
WILLIAM R. PRICE
BY
ATTORNEY

United States Patent Office 3,336,035
Patented Aug. 15, 1967

3,336,035
MULTIPLE PASSAGE GASKET
William R. Price, Haddon Heights, N.J., assignor to Flexitallic Company, Camden, N.J., a corporation of New Jersey
Filed Aug. 3, 1965, Ser. No. 476,804
3 Claims. (Cl. 277—204)

This invention relates to spiral wound gaskets and more particularly to gaskets for sealing multiple passage headers.

An object is to provide a gasket of the above type having novel and improved characteristics.

Another object is to provide a spiral wound gasket in combination with cross ribs which have similar compressibility and sealing characteristics.

Another object is to provide a spiral wound gasket carrying metal wrapped cross ribs and having improved means for securing the cross ribs in place.

Various other objects and advantages will be apparent as the nature of the invention is more fully disclosed.

The nature of the invention will be better understood from the following description, taken in connection with the accompanying drawing in which a specific embodiment has been set forth for purposes of illustration.

In the drawing:

FIG. 1 is an elevational view of the gasket;

FIG. 2 is a fragmentary axial cross-section of a flanged header with a gasket in sealing position;

FIG. 3 is a fragmentary portion of a gasket shown in FIG. 1, on an enlarged scale;

FIG. 4 is a vertical section of an enlarged scale through one of the ribs, taken on line 4—4 of FIG. 3 and FIG. 5 is an enlarged fragmentary section taken on line 5—5 of FIG. 1.

Referring to the drawing more in detail the invention is shown as embodied in a gasket for sealing a plurality of passages in headers 10 having peripheral walls 11 and pairs of transverse walls 12 forming three passages 13 and having transverse flanges 14 to be sealed and secured by a circle of bolts 15.

The gasket is formed with a peripheral portion 20 of the spiral wound type composed of a metal strip 21 having a central, longitudinal groove 22 on one side and a corresponding bead 23 on the other side of a V-shaped cross section to impart transverse compressibility to the strip. The metal strip 21 is wound together with a strip of compressible material 24 such as asbestos under a predetermined pressure to form a spiral wound gasket of standard construction with a plurality of convolutions of the metal strip 21 in metal to metal contact at the inner and the outer peripheries of the gasket and with the groove 22 exposed at the inner periphery.

A pair of transverse ribs 30 extend across the gasket in registration with the walls 12 of the headers 10. These transverse ribs 30 are composed of a strip 31 of asbestos which may be in the form of a single layer or may be built up in a plurality of layers and a metal strip 32 which extends the full length of the rib and is wrapped around the strip 31 to form a front wall 33, side walls 34 and a rear wall 35. The side edges 36 of the metal strip 32 are shown as spaced apart so that the rear wall 35 is only partially closed. The side edges may, however, be in contact or even overlapped to provide a complete closure for the rib, if desired.

The ends of the ribs 30 are abutted against the inner peripheral surface of the gasket and the metal strip 32 is arc welded to the inner surface of the metal strip 21 with introduction of metal at points 41 on one side of the groove 22 and at points 42 on the other side of such groove so that the rib is compressible with the strip 21.

When the ribs 30 are initially of the same thickness as the spiral wound gasket, the spaced welding above described permits the ribs to be compressed with the spiral wound gasket to form a complete seal as pressure is applied between the two flanges 14 by the bolts 15. At the same time the ends of the ribs 30 are brought into sealing contact with the inner surface of the metal strip 21. Since the metal strip 32 is deformable under compression and attached to the metal strip 21 at spaced points on opposite sides of the groove 22 the ribs do not interfere with the transverse compression of the spiral wound gasket.

While the gasket has been shown as adapted for use with a header having three passages, it is to be understood that it can be used with headers having various number of passages. In some instances it may be desirable to provide additional ribs which extend between and are secured to other ribs instead of the inner periphery of the spiral wound gasket. In such cases the additional ribs will be secured by the spaced welds to the side edges of the contacting ribs in the same manner as that described above for fastening the primary ribs of the spiral wound gasket.

What is claimed is:

1. A gasket for a multiple passage header comprising a spiral wound element composed of a metal strip having a central, longitudinal groove and bead, spiral wound with a compressible member in interleaved convolutions with the groove of said metal strip exposed on the inner periphery of the gasket, and at least one transverse cross rib extending across the interior of said gasket with ends abutted against the inner periphery of said metal strip, said rib being composed of a layer of compressible material and a metal member wrapped therearound to at least partially enclose said compressible material, said metal member having ends secured to said first metal strip at spaced points on opposite sides of said groove whereby said rib is compressible with said spiral wound gasket in response to transverse pressure.

2. A gasket as set forth in claim 1 in which said rib is secured in place by welding at spaced points.

3. A gasket as set forth in claim 1 in which said rib is secured in place by arc welding with introduction of metal at spaced points on each side of said groove.

References Cited

UNITED STATES PATENTS

| 2,442,312 | 5/1948 | Price | 277—204 |
| 2,828,987 | 4/1958 | Schmitz | 277—198 |
| 3,163,448 | 12/1964 | Franklin | 277—237 X |

SAMUEL ROTHBERG, *Primary Examiner.*